United States Patent
Norfleet et al.

(10) Patent No.: US 10,889,227 B1
(45) Date of Patent: Jan. 12, 2021

(54) TAILGATE LIFT ASSEMBLY AND RELATED APPARATUS

(71) Applicant: Backsaver International, Inc., Somerset, KY (US)

(72) Inventors: Ralph Norfleet, Somerset, KY (US); Jason Norfleet, Somerset, KY (US)

(73) Assignee: BACKSAVER INTERNATIONAL, INC., Somerset, KY (US)

( * ) Notice: Subject to any disclaimer, the term of this patent is extended or adjusted under 35 U.S.C. 154(b) by 130 days.

(21) Appl. No.: 16/394,832

(22) Filed: Apr. 25, 2019

Related U.S. Application Data

(60) Provisional application No. 62/694,646, filed on Jul. 6, 2018.

(51) Int. Cl.
| | | |
|---|---|---|
| *B62D 33/00* | (2006.01) | |
| *B60P 1/43* | (2006.01) | |
| *E05F 1/10* | (2006.01) | |
| *E05F 1/14* | (2006.01) | |

(52) U.S. Cl.
CPC ............ *B60P 1/438* (2013.01); *E05F 1/1041* (2013.01); *E05F 1/14* (2013.01); *E05Y 2800/11* (2013.01); *E05Y 2900/546* (2013.01)

(58) Field of Classification Search
CPC ............... B29C 66/9241; B29C 65/00; B29C 2793/009; B29C 2795/002; B29C 65/10; B65H 2220/02; B65H 2220/01; B29D 2030/482; B29D 30/48; A47L 25/005
See application file for complete search history.

(56) References Cited

U.S. PATENT DOCUMENTS

| | | | | |
|---|---|---|---|---|
| 4,806,062 A | * | 2/1989 | Stier .................... | B60P 1/4421 292/126 |
| 5,449,212 A | * | 9/1995 | Seifert ............... | B62D 33/0273 296/106 |
| 5,513,943 A | * | 5/1996 | Lugash ................. | B60P 1/4421 187/244 |
| 5,769,593 A | * | 6/1998 | Buffaloe ................ | B60P 1/435 296/57.1 |
| 6,126,223 A | * | 10/2000 | Rayburn ................ | B60P 1/438 296/57.1 |
| 6,485,004 B1 | * | 11/2002 | Licata ................... | B62D 33/03 267/177 |
| 6,820,910 B1 | * | 11/2004 | Tan .................... | B62D 33/0273 296/106 |
| 6,964,445 B1 | * | 11/2005 | Bellis, Jr. ............... | B60P 1/435 296/57.1 |
| 7,823,901 B2 | * | 11/2010 | Waddell ............... | B62D 63/061 280/401 |

(Continued)

*Primary Examiner* — Kiran B Patel
(74) *Attorney, Agent, or Firm* — King & Schickli, PLLC

(57) ABSTRACT

An assembly for assisting in lifting a tailgate includes an elongated housing extending along a predetermined length, a spring anchored at one end at a first end of the housing, and a connector having a first end affixed to the opposite end of the spring and extending through the housing. In one embodiment, at least three rollers are provided for engaging the connector. The rollers may be arranged in a variety of configurations to maintain the connector and spring in a generally centered location within the housing. In another embodiment, at least two vertically aligned guides are provided. A vehicle for integrating the foregoing assemblies is also provided.

20 Claims, 7 Drawing Sheets

(56) References Cited

U.S. PATENT DOCUMENTS

| | | | |
|---|---|---|---|
| 2004/0189036 A1* | 9/2004 | Norfleet | B60P 1/438 296/57.1 |
| 2005/0155289 A1* | 7/2005 | Oberheide | E05F 1/1091 49/340 |
| 2006/0226672 A1* | 10/2006 | Ruhlander | B62D 33/0273 296/50 |
| 2007/0252402 A1* | 11/2007 | Marshall | B62D 33/0273 296/57.1 |
| 2008/0246295 A1* | 10/2008 | Bejin | B60P 1/003 296/61 |
| 2010/0037528 A1* | 2/2010 | Lambright | B60P 1/438 49/347 |
| 2010/0109368 A1* | 5/2010 | Marshall | B62D 33/0273 296/57.1 |
| 2011/0110753 A1* | 5/2011 | Dieziger | B60P 1/43 414/538 |
| 2015/0115644 A1* | 4/2015 | Waskie | E05C 17/36 296/57.1 |
| 2017/0106921 A1* | 4/2017 | Norfleet | B62D 33/03 |
| 2019/0375280 A1* | 12/2019 | Jung | F16C 29/001 |
| 2020/0023784 A1* | 1/2020 | Flajnik | B62D 33/0207 |

\* cited by examiner

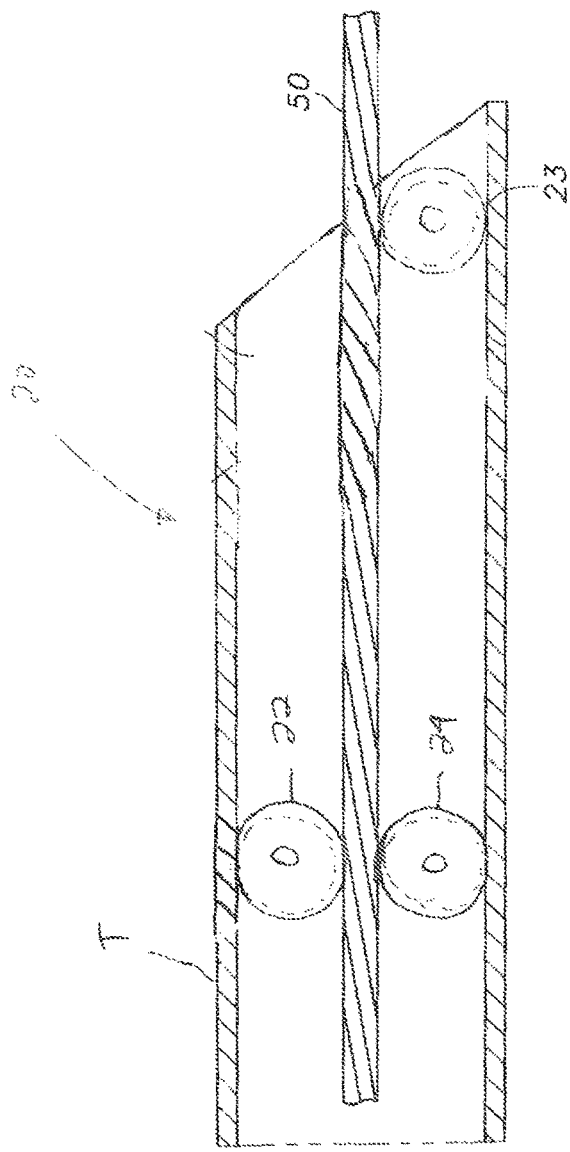
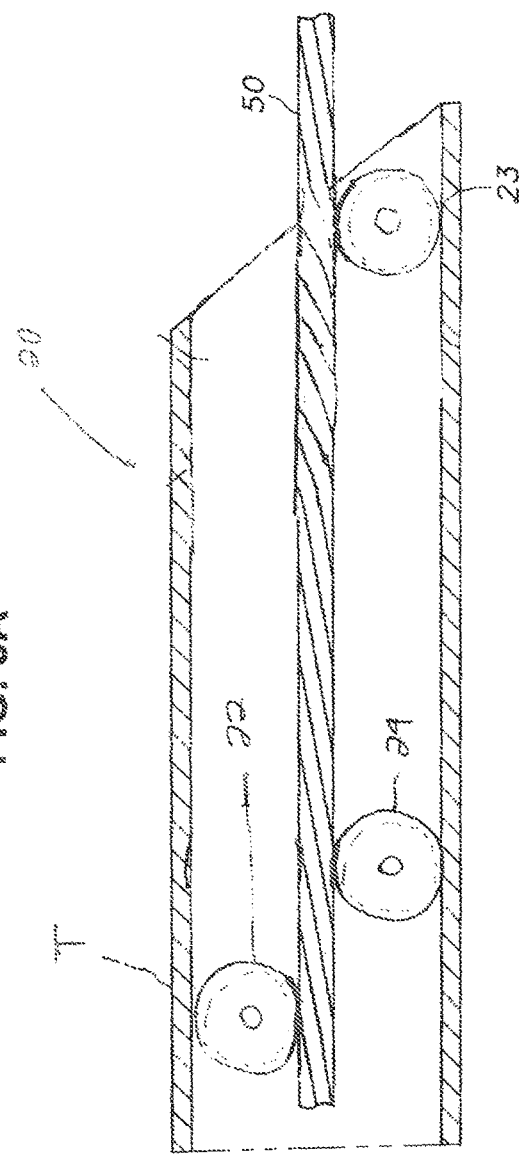
FIG. 3A
FIG. 3B

TAILGATE LIFT ASSEMBLY AND RELATED APPARATUS

This application claims the benefit of U.S. Provisional Patent Application Ser. No. 62/694,646, the disclosure of which is incorporated herein by reference. The disclosures of U.S. Patent Application Ser. Nos. 62/243,209, 62/280, 406, 62/314,107, 62/400,373, and U.S. Pat. Nos. 6,550,840 and 6,126,223, are fully incorporated herein by reference.

TECHNICAL FIELD

This disclosure relates to the vehicle arts and, more particularly, to a tailgate lift-assist device.

BACKGROUND

Tailgates are useful in conjunction with vehicles, such as trailers, for multiple purposes. Among these is the ability to prevent cargo from falling off during transportation. In addition, tailgates may be provided with a hinged connection, so that the tailgate in a lowered position may act as a ramp to aid in loading and unloading of cargo, such as tools and/or vehicles.

Due to the stability required by these functions, the tailgate material is normally quite substantial, and may be heavy, thereby presenting a challenge to the user. Specifically, raising and lowering the tailgate may require a user to bend over to the ground and lift the heavy tailgate to pivot the tailgate into a raised position. Similarly, when the tailgate is being pivoted to a lowered position, the user may have to support the weight of the tailgate in a bending position, as the tailgate is positioned on the ground. This range of motion of the body may be undesirable, as supporting significant weight (such as the weight of the tailgate) in a bent position may cause stress on the user's back. Tailgates also often have sharp corners that can cause injuries during the raising and lowering process if not kept in check.

Accordingly, a need is identified for solutions to these and other possible issues relating to the operation of tailgates and similar devices for vehicles.

SUMMARY

According to a first aspect of the disclosure, an assembly for use in assisting in lifting a tailgate, comprises a housing, a spring anchored at one end at a first end of said housing, and a connector having a first end affixed to the opposite end of said spring and extending through the housing. The assembly further includes at least three rollers for engaging the connector, and the connector extends below a first roller and above the second and third rollers of the at least three rollers.

In one embodiment the rollers maintain the connector and spring in a generally centered location within the housing. The rollers may be arranged in various alignments. In one example, the first and third rollers are vertically aligned. In another example, the first and third rollers are offset in a longitudinal direction of the housing.

According to a further aspect of the disclosure, an assembly for use in assisting in lifting a tailgate, comprises a housing, a spring anchored at one end at a first end of said housing, and a connector having a first end affixed to the opposite end of said spring and extending through said housing. The assembly further includes at least three guides for engaging the connector. The guides maintain the connector and spring in a generally centered location within the housing.

In one embodiment, the at least three guides comprise a first roller above the connector and second and third rollers below the connector. The rollers may be arranged in various alignments. In one example, the first and third rollers are vertically aligned. In another example, the first and third rollers are offset in a longitudinal direction of the housing.

According to a further aspect of the disclosure, an assembly for use in assisting in lifting a tailgate, comprising, a housing, a spring anchored at one end at a first end of the housing, and a connector having a first end affixed to the opposite end of said spring and extending through said housing. The assembly further includes at least two vertically aligned guides located within the housing for engaging the connector.

The at least two vertically aligned guides may take various forms. In one embodiment, the guides may comprise rollers. In one example, the rollers may comprise pulleys.

In one embodiment, a third guide for engaging the connector is also provided. The vertically aligned guide and the third guide may comprise rollers, and the rollers may comprise pulleys. A vehicle may also be provided including any of the above-referenced embodiments.

In the following description, there are shown and described several preferred embodiments of the disclosed inventions. As it should be realized, the arrangements are capable of other, different embodiments and its several details are capable of modification in various, obvious aspects all without departing from the description, as set forth and recited in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the inventions and, together with the description, serve to explain certain principles thereof. In the drawing figures:

FIGS. 3A and 3B are partially cutaway, partially cross-sectional side views showing possible roller positions;

Reference will now be made in detail to the present preferred embodiments of a tailgate lift assist and related apparatus, examples of which are illustrated in the accompanying drawing figures.

DETAILED DESCRIPTION

Figure 1:
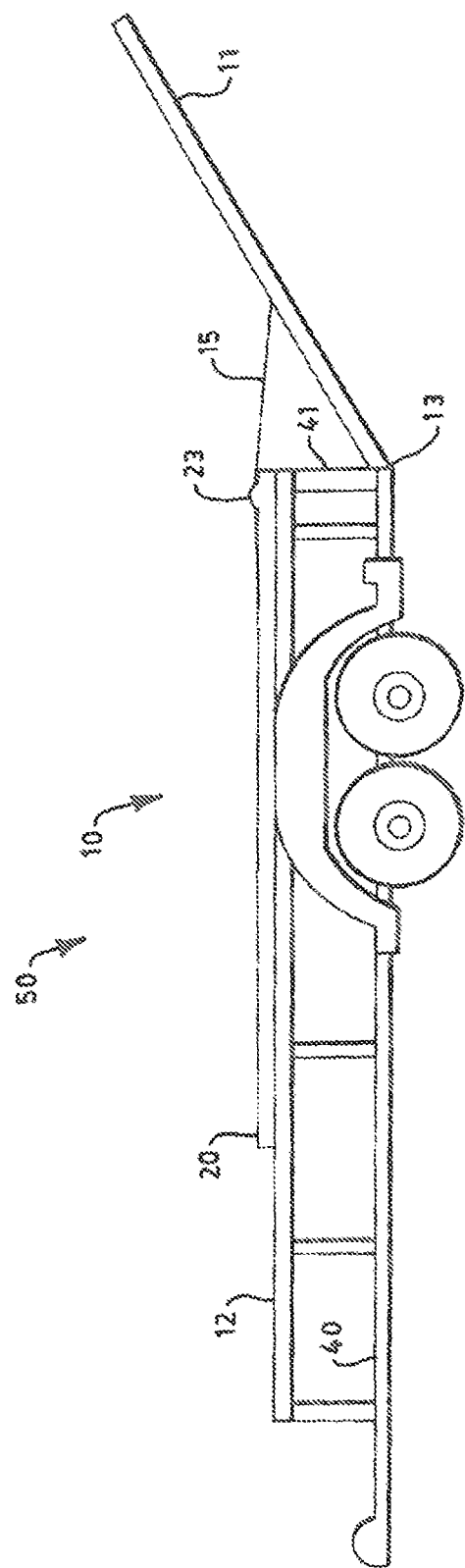
FIG. 1 is a side view of the tailgate lift assembly and trailer combination.

The tail gate lifting assembly 10 of the present invention in combination with the trailer 50 to which is attached is shown in FIG. 1. As disclosed therein, the trailer 50 is comprised of trailer side-rail 12, tailgate 11, and hinge connection 13 between the tailgate 11 and trailer bed 40. Further, the lifting assembly 10 is shown attached to the top portion of trailer side-rail 12 wherein the housing 20 of the lifting assembly 10 is shown. Retained within the housing and visible from the side view shown in FIG. 1 is first roller 22 and a second roller 23, as well as a third roller 24 (see FIGS. 3, 3A and 3B), which may comprise smooth wheels or grooved pulleys, as examples. Also detailed in FIG. 1 is the connector 15 which attaches the tailgate 11 to the trailer side-rail 12 in such a manner that the connector 15 is biased to aid in raising and lowering tailgate 11. Hinge 13 between the tailgate 11 and trailer bed 40 allows the tailgate to be rotated about an axis point which is along the back edge of trailer bed 40 coadjacent with the lower portion of tailgate 11. The lift assembly 10 as is shown aids in both the raising and lowering of tail gate 11 through a biased connector 15 such that little effort is required in order to raise and lower the tailgate 11.

Not shown in FIG. 1, but typically found in trailer designs are latch means to connect the tailgate 11 to the rear post support member 41 of the trailer side-rail 12 in such a manner that the tailgate, when placed in the raised position, is locked in the upward position. Such locking mechanism prevents the tailgate 11 from being lowered unless it is unlatched. These locking mechanisms may be readily integrated with the tailgate assembly and trailer presently described.

Figure 2:
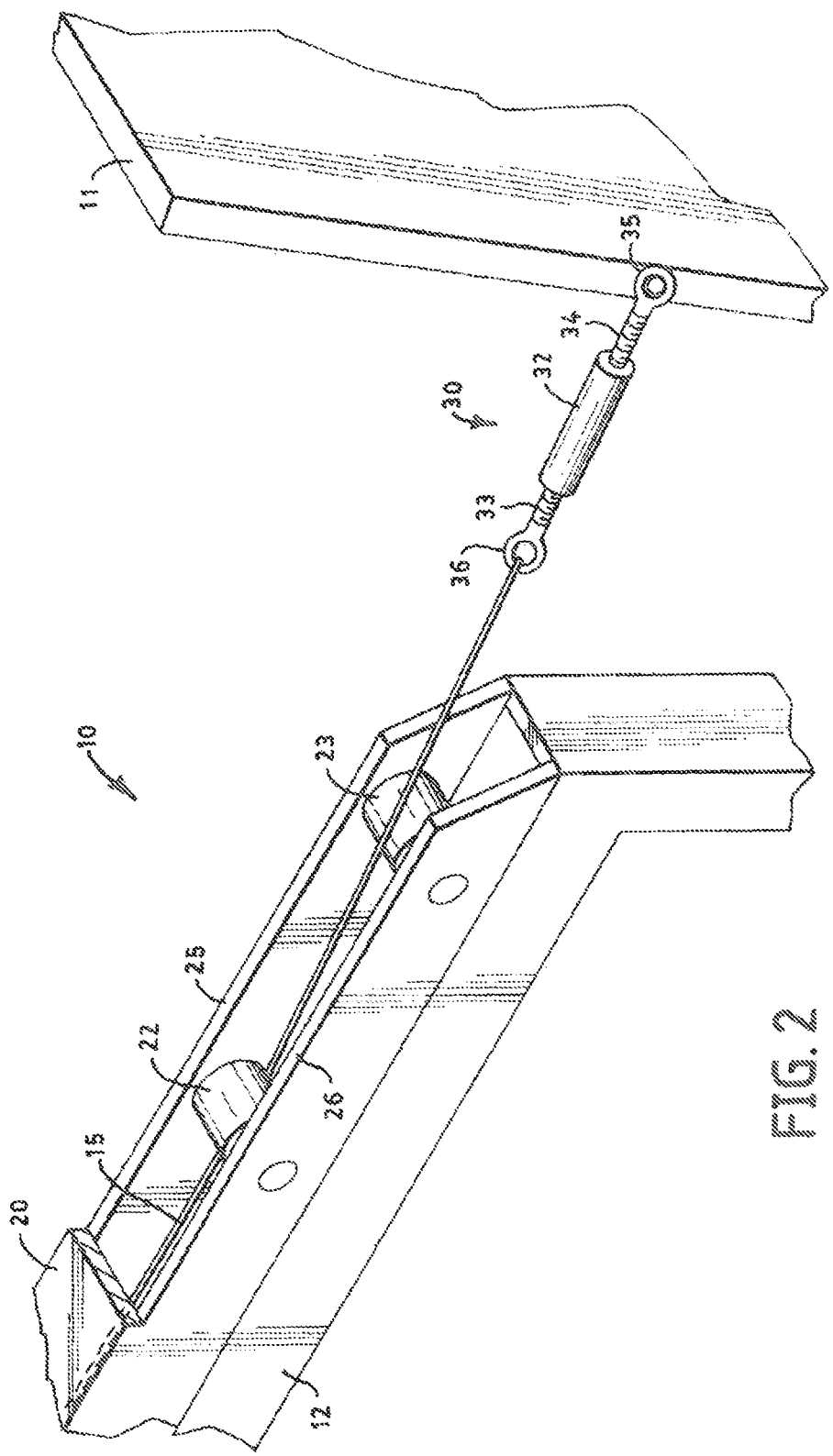
FIG. 2 is an upper perspective view of the tailgate lift assembly.

A more clearly depicted disclosure of the lifting assembly 10 of the present invention is shown in FIG. 2 wherein the lifting assembly 10 is attached to the upper portion of trailer side-rail 12. As is shown in FIG. 2, the tailgate lifting assembly 10 is securely affixed to the top section of trailer side-rail 12. However, it may be readily apparent to those of ordinary skill in the art that the lifting assembly 10 may be fully integrated within the top portion of trailer rail 12 such that the assembly 10 is coextensive with the top portion of the rail.

As is shown in FIG. 2, the lifting assembly 10 is comprised of a housing 20 which retains therein several elements of the lifting assembly 10. Extending rearwardly is connector 15 which securely attaches the tailgate 11 to the trailer side rail 12. The connector 15 may be a stainless steel cable capable of withstanding high pound force such as a two-thousand-pound steel cable. Additionally, as can be seen from the perspective view of FIG. 6 and top view of FIG. 4, two connectors are utilized to secure the tailgate 11 to the trailer 50. Thus, upon accidental breakage of one connector, the remaining connector will have sufficient strength to still retain the tailgate 11 in the upward position.

Returning to FIG. 2, connector 15 extends rearwardly from the housing 20 to the tailgate 11. In combination with FIG. 2, FIG. 3 additionally discloses the makeup of the secure attachment of the connector 11 to the housing 20. In reference to both FIGS. 2 and 3, an optional turnbuckle 30 is utilized at the rearward most end of connector 30 directly adjacent to tailgate 11. Turnbuckle 30 is comprised of a cylindrical collar 32 which has threaded openings on either end. Inserted into each threaded opening are first pin 33 and second pin 34. First pin 33 is designed such that eyelet 36 extends rearwardly for attachment to connector 15 and has on its opposite end a threaded portion which is threadably received into collar 32. Additionally, extending from the other side of collar 32 is second pin 34 which has eyelet 35 extending rearwardly therefrom and a treaded neck portion which extends internally into collar 32. Utilization of turnbuckle 30 allows the user to adjust the length and tension of connector 15 as well as the amount of eventual force required for raising and lowering the tailgate 11.

The amount of force required in the biasing of connector 15 may be significant in that the tailgate 11 found on many typical trailers can be exceptionally heavy. It is not uncommon to find a tailgate which weighs in excess of two hundred pounds. Thus the connector 15 must be biased and tension in such a way so that the user may, with relative ease, raise and lower the heavy tailgate. Adjustment of the tension, the origin of which will be described herein, may thus be accomplished through utilization of turnbuckle 30 and collar 32.

Figure 3:
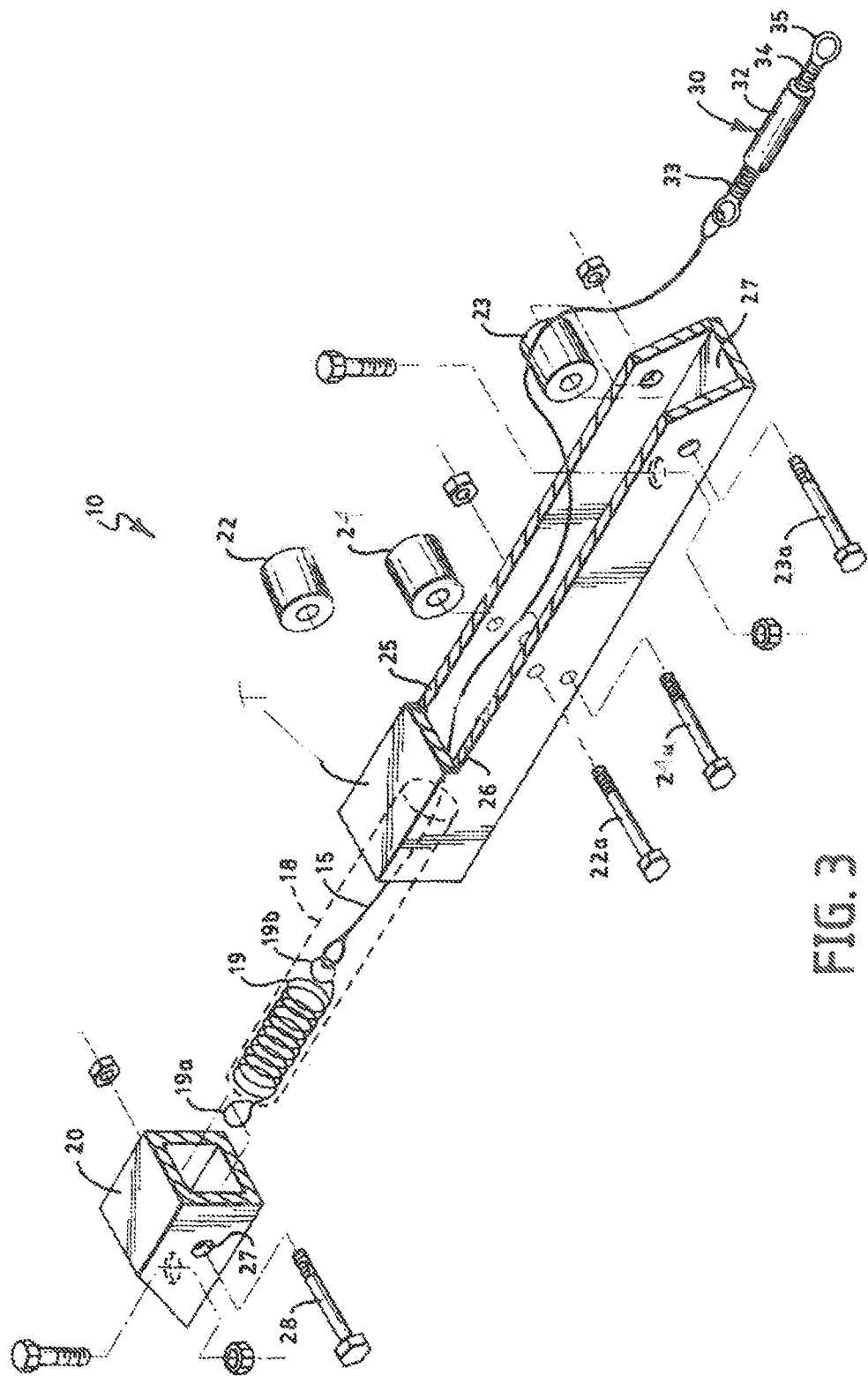
FIG. 3 is an exploded view of the tailgate lift assembly.

Turning back to the lifting assembly 10 disclosed in FIGS. 2 and 3, it may be seen that the connector is biased by spring 19. Spring 19 is retained within housing 20 through the use of anchoring bolt 28. The spring 19 can be a standard steel spring capable of providing about 150 pounds of force. As shown in FIG. 3, the spring is retained within housing 20 by anchoring bolt 28 which extends through an attachment eyelet 19a or other standard affixing mechanism utilized for high tension springs.

At the opposite end of spring 19 is securely affixed the forward end of connector 15 through spring attachment eyelet 19b. The connector 15 is attached such that spring 19, securely anchored to housing 20, biases the tension on connector 15 such that rearward axial movement of the connector 15 causes high tension to appear thereon, biasing the spring to return in its untensioned position. Thus, the connector 15 will have significant tension biasing the connector in the forward position such that the tailgate 11 to which it is attached will want to raise. However, such tensioning may be adjusted so that the tailgate 11 will only raise upon upward force applied thereto. Such adjustment to the tensioning is provided through turnbuckle 30 previously disclosed herein. The adjustments provided may be finely tuned such that a minimal amount of upward force need be provided before the tailgate begins its upward movement. Thus, tensioning may be fine-tuned to a point where only 5 to 10 pounds of force may be required to raise the relatively heavy tailgate 11 which is hingedly attached to trailer bed 40 through hinge 13.

Returning to both FIGS. 2 and 3, it is apparent therein that connector 15 utilizes a first roller 22, a second roller 23, and a third roller 24. The rollers 22, 23, 24 provide a guiding mechanism by which the connector 15 may move axially within the housing 20 and rearward therefrom with relative ease. Rollers 22, 23, 24 are securely affixed between lifting assembly side-wall 26 and sidewall 25. First roller 22 is rotatably affixed to sidewalls 25 and 26 through roller pin 22a. Second roller 23 is rotatably affixed to sidewall 25 and 26 throughout the use of roller pin 23a. Third roller 24 is rotatably affixed to sidewall 25 and 26 through the use of a roller pin 24a. Rollers 22, 23, and 24 are thus rotatable within the area between sidewalls 25 and 26, but could also take the form of fixed guides.

Figure 6:
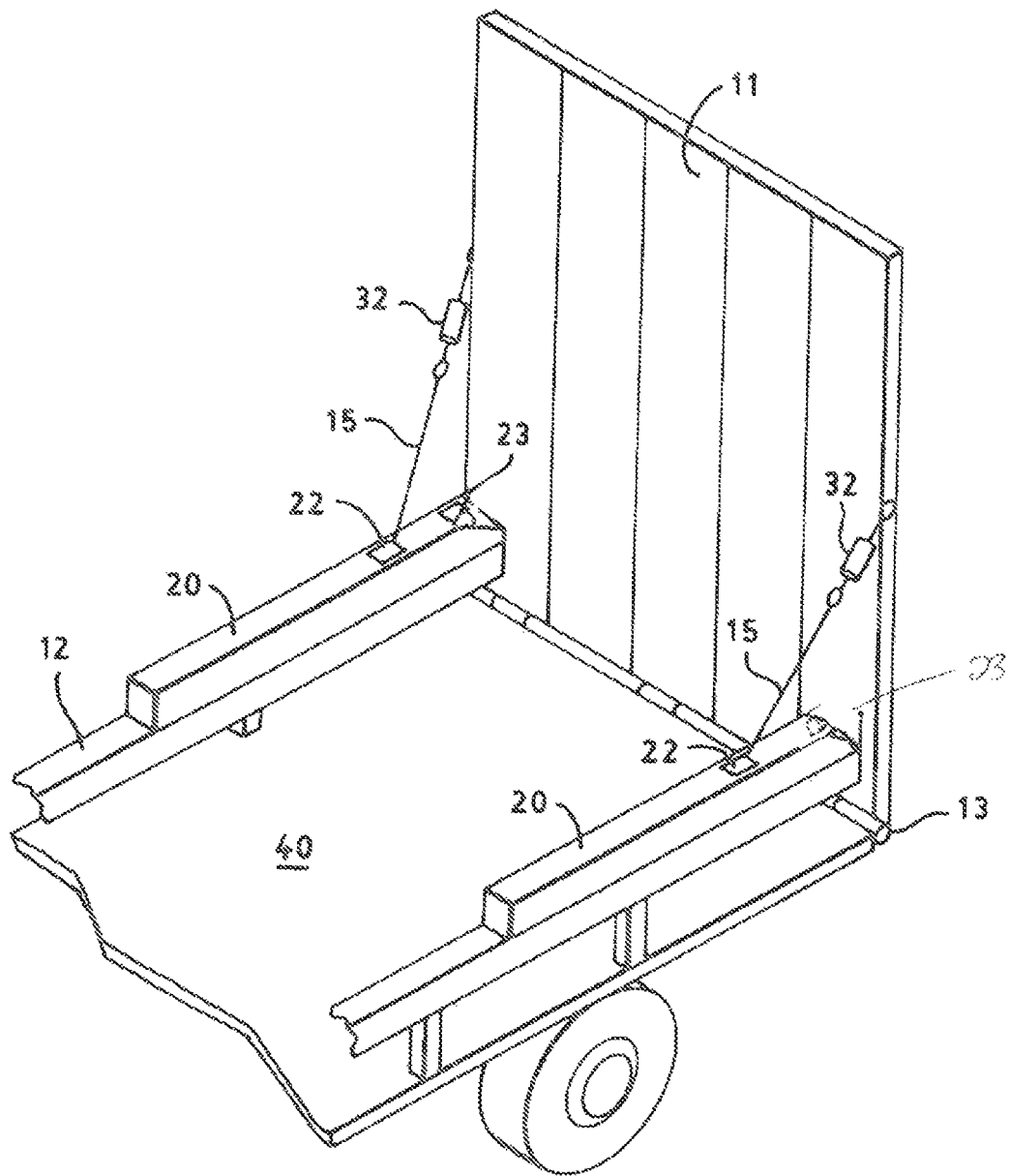
FIG. 6 is a perspective view of the trailer and tailgate lift assembly with the tailgate in the closed position.

As can be seen in both FIG. 2 and FIG. 3, the top wall T of assembly housing 20 is shortened and removed from a point just before the placement of first roller 22. Top wall T of housing 20 does not extend completely to the rearward portion of housing 20 since connector 15 must extend upwardly outside of the area of containment of housing 20, as can be seen in FIG. 6, at a point in between rollers 22, 24 and roller 23. Thus, when the tailgate 11 is in the fully raised position, connector 15 will extend upward at an angle from between first and second rollers 22, 24 to a point in contact with tailgate 11.

Returning to FIG. 2, FIG. 3, and FIG. 3A, the connector 15 extends underneath first roller 22, and above second and third rollers 23, 24 (which as indicated by the dashed line in FIG. 3 may comprise pulleys, with a groove for receiving the connector 15 when engaged thereby). As the tailgate 11 is lowered from its raised position, rollers 22, 24 will allow the connector 15 to move rearwardly thereunder through rotational movement and due to the tensions caused by the spring 19. At some point during lowering of the tailgate 11, connector 15 will come into contact with second roller 23 which will additionally aid in lowering the tailgate 11 by placing downward force on second roller 23 once in contact with connector 15. As the tailgate 11 is further lowered, the rollers 22, 23, 24 may rotate, thereby aiding in the rearward movement of connector 15. Once in the fully lowered position, connector 15 will extend again below roller 22, and above rollers 23, 24 and downward therefrom at an angle determined by the position of connection of connector 15 on the trailer tailgate 11 side-rail member.

Returning to FIG. 3, it may be seen that spring 19 is housed within assembly housing 20. Anchoring bolt 28 extends through aperture 27 in order that the attachment eyelet 19a may be anchored in place within housing 20. Spring 19 is retained completely within housing 20 providing an additional safety factor therein. Further, spring 19 is surrounded by plastic tubing or sleeve 18 which extends rearward from the spring toward the tailgate a distance which covers the amount of extension of the spring 19 when the tailgate 11 is placed in the lowered position. Plastic tubing 18 surrounds spring 19 such that as the spring is tensioned by lowering of tailgate 11, the high-tension spring will not come into contact with the interior of housing 20 thereby causing frictional noises or other undesirable characteristics. Tubing 18 additionally protects the spring 19 and retains it appropriately within housing 20. The spring 19 may extend approximately 18 inches in length and may, upon full tensioning of lowering of the tailgate 11 extend rearward approximately double that original untensioned length.

As is additionally shown in FIG. 3, the housing 20 is provided with means for attachment to the top portion of trailer sidewall 12. A plurality of apertures are found on the bottom portion of housing 20 such that the housing 20 may be securely affixed to the trailer side rail 12. Standard bolts may be applied thereto or the housing 20 may be affixed utilizing welding or other commonly known techniques. As has also been previously disclosed, the lifting assembly 10 may be fully integrated within the top portion of trailer side-rail 12 such that it is integral therewith.

As indicated in FIG. 3A, the rollers 22, 24 may be vertically aligned, or may be staggered on a longitudinal direction of the housing 20, as shown in FIG. 3B. In either case, the presence of two rollers provides additional mechanical advantage that may allow for a less robust spring 19 to be used. Furthermore, the two rollers 22, 24, in combination with the closed nature of the housing 20, helps to maintain the spring in a centered position, and reduces noise. Furthermore, should the spring 19 break apart or come loose, the rollers 22, 24 serve as a guard to prevent it from escaping the housing 20 in the forward direction.

Figure 4:
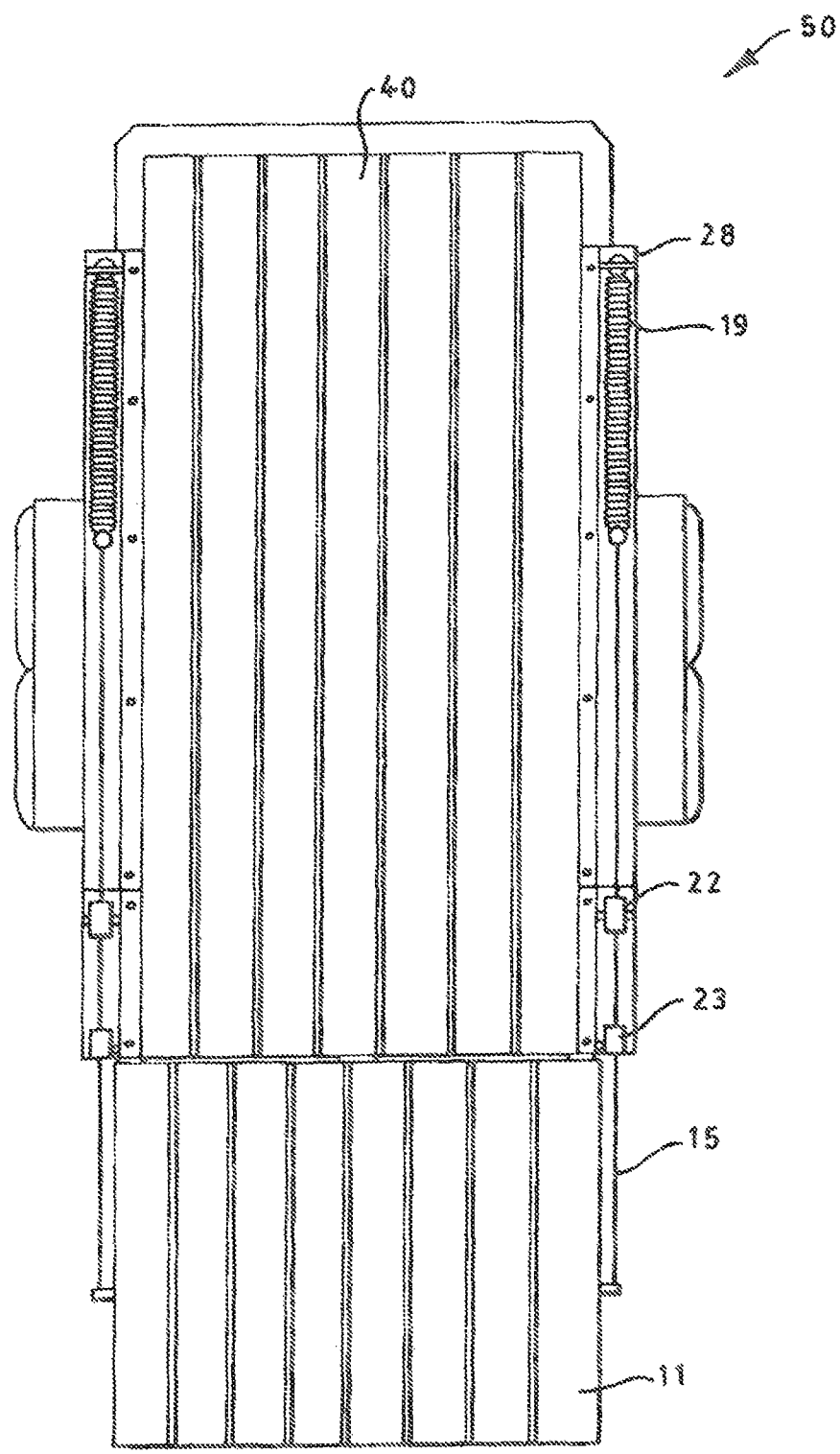
FIG. 4 is a top view of the tailgate lift assembly and trailer combination.

Turning to FIG. 4, a top view of the lifting assembly 10 is disclosed in combination with the trailer 50. Tailgate 11 is shown in the open position wherein connector 15 extends rearwardly from the tailgate over rollers 22, 23, and 24 into the housing 20. Spring 19 is securely affixed to the connector 15 and is anchored to the housing by anchoring bolt 28. As shown therein, the spring 19 is tensioned to its fully extended position thereby biasing the connector 15 and causing the tailgate to be readily lifted.

Figure 5:
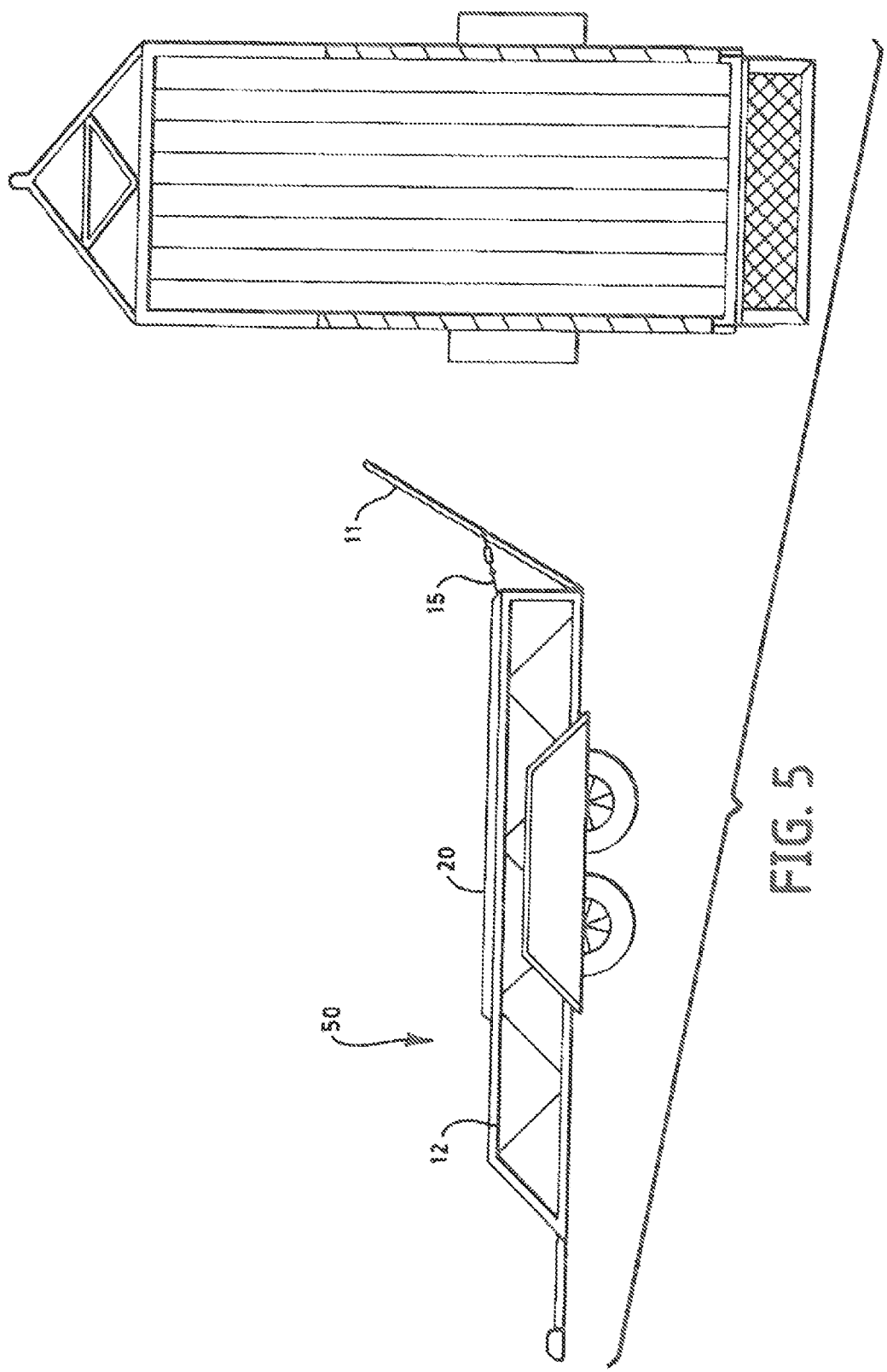
FIG. 5 is a side view of the tailgate lift assembly and trailer.

Turning to FIG. 5, the tailgate 11 is shown in the half-raised position where from the side view it is apparent that connector 15 will soon extend upward over the housing sidewalls 25 and 26. As is shown in FIG. 6, the tailgate 11 is in the fully raised position and the connector extends upward from the first and second rollers 22, 24 to the tailgate which is in the raised and locked position. Tailgate 11 rotates about hinge 13 and turnbuckle 30 allows, as previously mentioned, adequate adjustment of tensioning for spring 19. Spring 19, while not shown in FIG. 6, is now in the slightly untensioned position while still maintaining adequate forward force on connector 15 thereby causing the tailgate 11 to be maintained in the raised position. Additionally, not shown, the tailgate 11 may be locked into place through locking mechanisms affixed to the end portion of side-rail 12 and the side-rails of the tailgate.

The foregoing descriptions of various embodiments provide illustration of the inventive concepts. The descriptions are not intended to be exhaustive or to limit the disclosed invention to the precise form disclosed. Modifications or variations are also possible in light of the above teachings. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. Any species element of a genus element can have the characteristics or elements of any other species element of that genus. The term "comprising" is not meant to be limiting. While a generally horizontal orientation is shown, the apparatus disclosed may be used in any orientation, including vertically. The above-described configurations, elements or complete assemblies and methods and their elements for carrying out the invention, and variations of aspects of the invention can be combined and modified with each other in any combination.

The invention claimed is:

1. An assembly for intended use in assisting in lifting a tailgate, comprising:
   an elongated housing having a first end;
   a spring anchored at one end at the first end of the housing;
   a connector having a first end affixed to the opposite end of said spring and extending through said housing; and
   at least three rollers for engaging the connector.

2. The assembly of claim 1, wherein the connector extends below a first roller and above second and third rollers of said at least three rollers.

3. The assembly of claim 2, wherein the first and third rollers are vertically aligned.

4. The assembly of claim 2, wherein the first and third rollers are offset in a longitudinal direction of the housing.

5. The assembly of claim 1, wherein the rollers maintain the connector and spring in a generally centered location within the housing.

6. The assembly of claim 1, wherein one or more of the at least three rollers comprise pulleys.

7. A vehicle including the assembly of claim 1.

8. An assembly for intended use in assisting in lifting a tailgate, comprising:
   an elongated housing having a first end;
   a spring anchored at one end at the first end of the housing;

a connector having a first end affixed to the opposite end of said spring and extending through said housing; and at least three guides for engaging the connector.

9. The assembly of claim 8, wherein the at least three guides comprise a first roller above the connector and second and third rollers below the connector.

10. The assembly of claim 9, wherein the first and third rollers are vertically aligned.

11. The assembly of claim 9, wherein the first and third rollers are offset in a longitudinal direction of the housing.

12. The assembly of claim 8, wherein the guides maintain the connector and spring in a generally centered location within the housing.

13. The assembly of claim 8, wherein one or more of the at least three guides comprise pulleys.

14. A vehicle including the assembly of claim 8.

15. An assembly for intended use in assisting in lifting a tailgate, comprising:

a housing extending along a predetermined length;

a spring anchored at one end at a first end of the housing;

a connector having a first end affixed to the opposite end of said spring and extending through said housing; and at least two vertically aligned guides located within the housing for engaging the connector.

16. The assembly of claim 15, wherein the at least two vertically aligned guides comprise rollers.

17. The assembly of claim 15, further including a third guide for engaging the connector.

18. The assembly of claim 17, wherein the vertically aligned guide and the third guide comprise rollers.

19. The assembly of claim 15, wherein the at least two vertically aligned guides comprise pulleys.

20. A vehicle including the assembly of claim 15.

* * * * *